US012744289B2

(12) United States Patent
Fujisaki

(10) Patent No.: US 12,744,289 B2
(45) Date of Patent: Sep. 22, 2026

(54) SECONDARY BATTERY

(71) Applicant: TOYOTA JIDOSHA KABUSHIKI KAISHA, Toyota (JP)

(72) Inventor: Sadao Fujisaki, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1001 days.

(21) Appl. No.: 17/647,648

(22) Filed: Jan. 11, 2022

(65) Prior Publication Data

US 2022/0263206 A1 Aug. 18, 2022

(30) Foreign Application Priority Data

Feb. 12, 2021 (JP) ................................ 2021-021141

(51) Int. Cl.

*H01M 50/147* (2021.01)
*H01M 10/0585* (2010.01)
*H01M 50/102* (2021.01)
*H01M 50/207* (2021.01)
*H01M 50/557* (2021.01)

(52) U.S. Cl.

CPC ..... *H01M 50/557* (2021.01); *H01M 10/0585* (2013.01); *H01M 50/102* (2021.01); *H01M 50/147* (2021.01); *H01M 50/207* (2021.01)

(58) Field of Classification Search

None
See application file for complete search history.

(56) References Cited

U.S. PATENT DOCUMENTS

| | | | |
|---|---|---|---|
| 6,743,546 B1 | 6/2004 | Kaneda et al. |
| 2007/0231685 A1 | 10/2007 | Takeuchi et al. |
| 2010/0040942 A1 | 2/2010 | Hatta et al. |
| 2011/0117404 A1 | 5/2011 | Ahn et al. |
| 2011/0242732 A1 | 10/2011 | Kobayashi et al. |
| 2018/0301669 A1 | 10/2018 | Schneider et al. |
| 2022/0263206 A1 | 8/2022 | Fujisaki |

FOREIGN PATENT DOCUMENTS

| | | |
|---|---|---|
| CN | 102064338 A | 5/2011 |
| CN | 102227792 A | 10/2011 |
| EP | 2 333 891 A1 | 6/2011 |
| EP | 2 375 427 A1 | 10/2011 |
| JP | 2001283798 A | 10/2001 |

(Continued)

*Primary Examiner* — Haixia Zhang
(74) *Attorney, Agent, or Firm* — Dickinson Wright, PLLC

(57) ABSTRACT

To provide a secondary battery capable of improving the structural efficiency, the secondary battery includes: an electrode stack; and an outer casing, wherein the outer casing includes a hollow-shaped laminated-film outer casing, and an inner lid disposed at an opening part of the laminated-film outer casing, the inner lid has a protruding part extending from a peripheral portion thereof to an inside of the outer casing, and at least part of the electrode stack is present in an area surrounded by the protruding part, in the stacking direction, a thickness of the inner lid is smaller than a thickness of the electrode stack, and the peripheral portion of the inner lid and part of the laminated-film outer casing are joined to each other to seal the electrode stack in the outer casing, the part overlapping the peripheral portion of the inner lid.

4 Claims, 8 Drawing Sheets

(56) References Cited

FOREIGN PATENT DOCUMENTS

| | | | | |
|---|---|---|---|---|
| JP | 2005317312 | A | | 11/2005 |
| JP | 2010-153733 | A | † | 7/2010 |
| JP | 2011009175 | A | | 1/2011 |
| JP | 2011-108623 | A | † | 6/2011 |
| JP | 2012245763 | A | | 12/2012 |
| JP | 2013-097890 | A | † | 5/2013 |
| JP | 2013131427 | A | | 7/2013 |
| JP | 2013258093 | A | | 12/2013 |
| JP | 2015116706 | A | | 6/2015 |
| KR | 20070012842 | A | | 1/2007 |
| KR | 20080078002 | A | | 8/2008 |
| KR | 20140130032 | A | | 11/2014 |
| KR | 102746637 | B1 | | 12/2024 |
| WO | 2000/059063 | A1 | | 10/2000 |
| WO | 2012/091196 | A1 | | 7/2012 |

† cited by third party

Fig. 3A
(CONVENTIONAL)
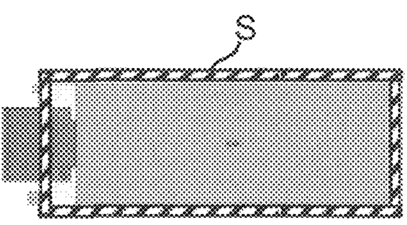

Fig. 4 (CONVENTIONAL)
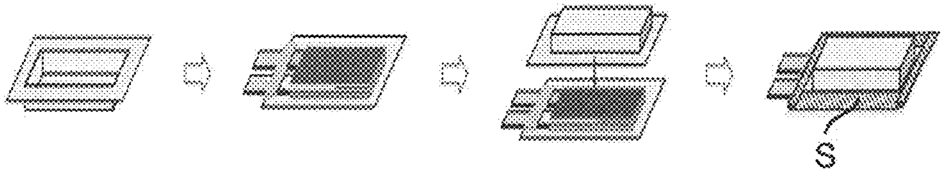

Fig. 6 (CONVENTIONAL)
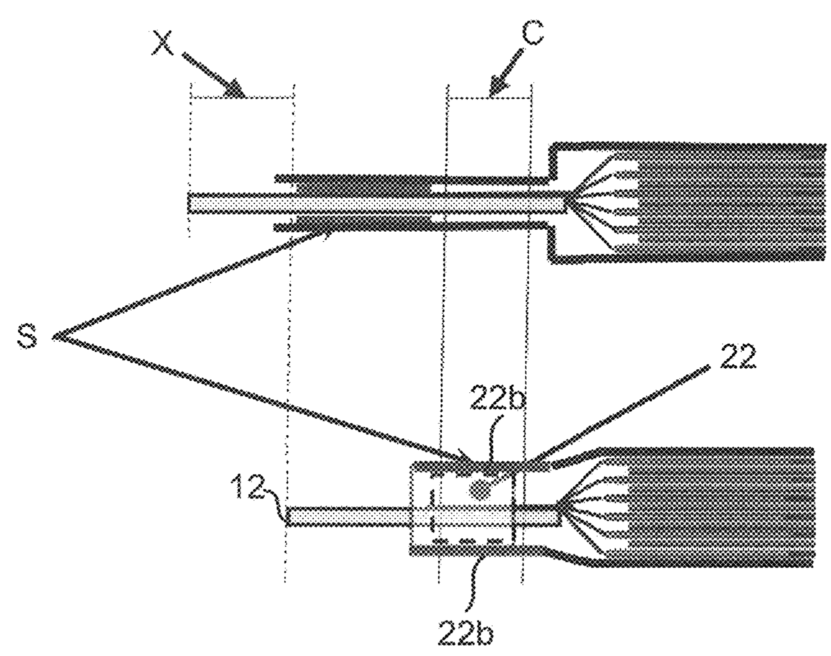

22d
22g
22f
Y
Z
22a
22e
22c

SECONDARY BATTERY

FIELD

The present application relates to a secondary battery.

BACKGROUND

Conventionally, secondary batteries formed of an electrode element and an outer casing housing the electrode element thereinside have been developed. An aluminum can, a laminated film, or the like is often used as the material of the outer casing. When a laminated film is used, the laminated film is heat-welded, so that the electrode element is sealed in the outer casing. Concerning such a technique, for example, Patent Literatures 1 to 3 each disclose a battery using a laminated-film outer casing.

CITATION LIST

Patent Literature

Patent Literature 1: JP 2001-283798 A
Patent Literature 2: JP 2015-116706 A
Patent Literature 3: JP 2013-131427 A

SUMMARY

Technical Problem

According to the techniques described in Patent Literatures 1 to 3, a battery where an electrode element is sealed in an outer casing is made by: using the outer casing formed by superposing two laminated films; storing the electrode element in the outer casing; and heat-welding the peripheral portion of the outer casing. In such a battery, a heat-welded sealing portion is present along the peripheral portion. The sealing portion needs a certain sealing width for satisfying requirements such as a predetermined strength and moisture transmittance. This causes deterioration of the structural efficiency of the battery.

With the foregoing actual circumstances in view, an object of the present disclosure is to provide a secondary battery capable of improving the structural efficiency.

Solution to Problem

For solving the above problem, one aspect of the present disclosure is a secondary battery comprising: an electrode stack formed by stacking a sheet-shaped electrode element; and an outer casing housing the electrode stack thereinside, wherein the outer casing includes a hollow-shaped laminated-film outer casing that covers at least both end faces and a pair of facing side faces of the electrode stack in a stacking direction, and an inner lid disposed at an opening part of the laminated-film outer casing, the inner lid has a protruding part extending from a peripheral portion thereof to an inside of the outer casing, and at least part of the electrode stack is present in an area surrounded by the protruding part, in the stacking direction, a thickness of the inner lid is smaller than a thickness of the electrode stack, and the peripheral portion of the inner lid and part of the laminated-film outer casing are joined to each other to seal the electrode stack in the outer casing, the part overlapping the peripheral portion of the inner lid.

In the secondary battery, the electrode stack may have a stack formed by: stacking a current collector, a cathode layer, an electrolyte layer, and an anode layer; and an electrode terminal connected to the current collector, the inner lid may have a through hole penetrated by the electrode terminal, the electrode terminal penetrating the through hole to stick out, and in the area, the current collector and the electrode terminal may be connected to each other. In addition, at least part of the protruding part may have a gently concave shape. Further, the laminated-film outer casing may be formed by molding one laminated film to have a hollow shape.

Advantageous Effects

The secondary battery according to the present disclosure is capable of improving the structural efficiency.

BRIEF DESCRIPTION OF DRAWINGS

FIG. 3A is a top view of a conventional secondary battery;

FIG. 4 shows one example of a method of manufacturing a conventional secondary battery;

FIG. 6 is a cross-sectional view of a conventional secondary battery (top) and the secondary battery 100 (bottom), focusing on electrode terminals sides.

FIG. 8A shows one of the inner lids 22 which is disposed on the side where electrode terminal 12 is provided; and FIG. 8B shows the other of the inner lids 22 which is disposed on the side where the electrode terminal 12 is not provided.

DESCRIPTION OF EMBODIMENTS

A feature of a secondary battery according to the present disclosure is to comprise: an electrode stack formed by stacking a sheet-shaped electrode element; and an outer casing housing the electrode stack thereinside, wherein the outer casing includes a hollow-shaped laminated-film outer casing that covers at least both end faces and a pair of facing side faces of the electrode stack in a stacking direction, and an inner lid disposed at an opening part of the laminated-film outer casing, the inner lid has a protruding part extending from a peripheral portion thereof to an inside of the outer casing, and at least part of the electrode stack is present in an area surrounded by the protruding part, in the stacking direction, a thickness of the inner lid is smaller than a thickness of the electrode stack, and the peripheral portion of the inner lid and part of the laminated-film outer casing are joined to each other to seal the electrode stack in the outer casing, the part overlapping the peripheral portion of the inner lid.

The secondary battery according to the present disclosure includes an inner lid having a predetermined protruding part along the peripheral portion, wherein at least part of an electrode stack is present in the area surrounded by the protruding part, and the peripheral portion of the inner lid and a laminated-film outer casing are joined to each other. That is, the area surrounded by the protruding part, and the joined portion (sealing portion) overlap, and in this area, at least part of the electrode stack is present. Therefore, according to the secondary battery of the present disclosure, the inside of the sealing portion, which has not been effectively utilized conventionally, is utilized whereby the structural efficiency can be improved. The improvement of the structural efficiency can lead to improvement in the volumetric energy density of the battery.

Figure 1:
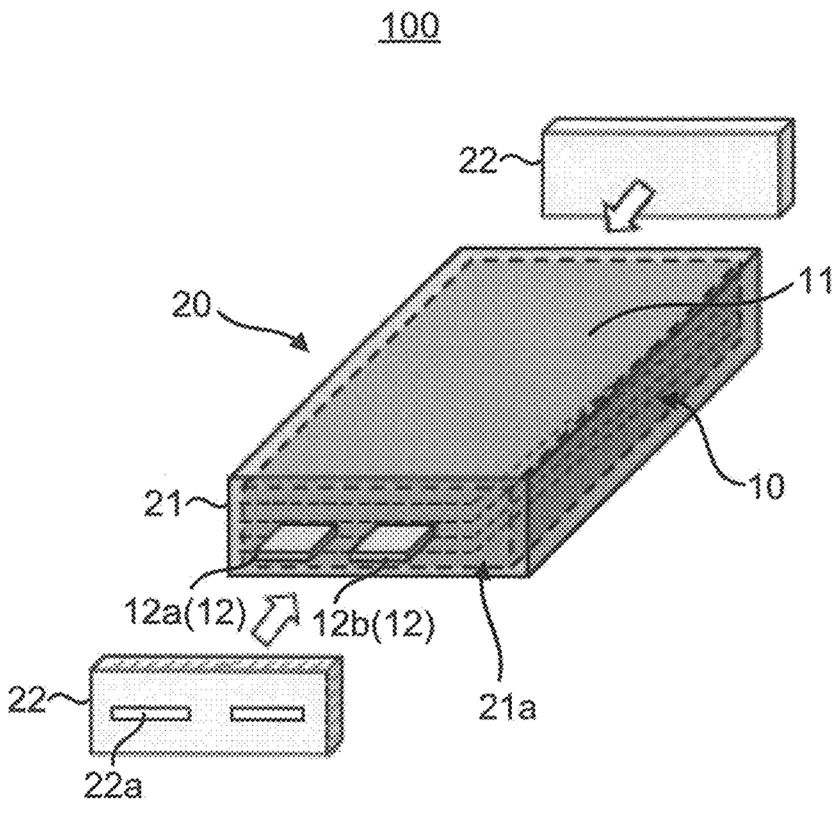
FIG. 1 is a schematic view of a secondary battery 100.
Figure 2:
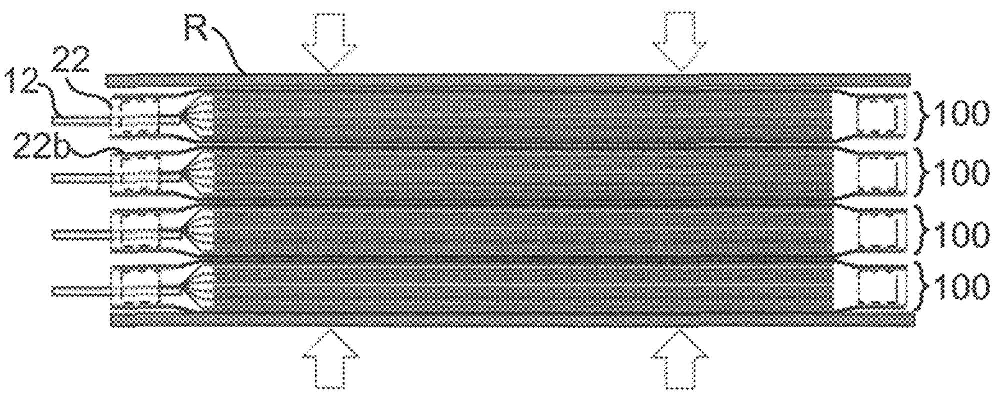
FIG. 2 is a cross-sectional view when a plurality of the secondary batteries 100 are stacked.

Hereinafter the secondary battery according to the present disclosure will be described in detail, using a secondary battery 100 that is one embodiment. FIG. 1 is a schematic view of the secondary battery 100. For convenience, FIG. 1 shows the secondary battery 100 in a state where inner lids 22 are removed. FIG. 2 is a cross-sectional view when a plurality of the secondary batteries 100 are stacked.

As shown in FIGS. 1 and 2, the secondary battery 100 is provided with an electrode stack 10 formed by stacking (a) sheet-shaped electrode element(s), and an outer casing 20 housing the electrode stack 10 thereinside.

<Electrode Stack 10>

The electrode stack 10 includes a stack 11 formed by stacking a cathode current collector, a cathode layer, an electrolyte layer, an anode layer and an anode current collector in this order, and electrode terminals 12. The foregoing electrode element means a cathode current collector, a cathode layer, an electrolyte layer, an anode layer, and an anode current collector.

The number of the electrode element stacked for the stack 11 is not particularly limited, and may be suitably set according to a desired performance of the battery. Preferably, the stack 11 formed by stacking each plurality of cathode current collectors, cathode layers, electrolyte layers, anode layers and anode current collectors is used.

Any known metal foil may be used for the cathode current collector and the anode current collector. Examples of the metal foil include foil of metals such as Cu, Ni, Cr, Au, Pt, Ag, Al, Fe, Ti, Zn, Co, and stainless steel.

The cathode layer contains at least a cathode active material. The cathode active material is not particularly limited as long as usable for all-solid-state lithium ion batteries. Examples of the cathode active material include lithium cobaltate, lithium nickelate (NCA-based active materials), lithium manganate, and lithium nickel cobalt manganate. The cathode layer may optionally contain a solid electrolyte, a conductive aid, or a binder. Examples of the solid electrolyte include oxide solid electrolytes and sulfide solid electrolytes. Examples of the conductive aid include carbon materials such as acetylene black, Ketjenblack, and vapor grown carbon fiber (VGCF). Examples of the binder include butadiene rubber (BR), butyl rubber (IIR), and polyvinylidene fluoride (PVdF). The contents of the foregoing in the cathode layer, and the thickness of the cathode layer may be the same as conventional ones.

The electrolyte layer contains at least a solid electrolyte. The solid electrolyte is not particularly limited as long as usable for all-solid-state lithium ion batteries. For example, the solid electrolyte same as that used in the cathode layer may be used. The electrolyte layer may optionally contain a binder. The binder same as that used in the cathode layer may be used. The contents of the foregoing in the electrolyte layer, and the thickness of the electrolyte layer may be the same as conventional ones.

The anode layer contains at least an anode active material. The anode active material is not particularly limited as long as usable for all-solid-state lithium ion batteries. Examples of the anode active material include metal active materials such as Li and Si, carbon active materials such as graphite, and oxide active materials such as $Li_4Ti_5O_{12}$. The anode layer may optionally contain a solid electrolyte, a conductive aid, or a binder. The solid electrolyte, the conductive aid, and the binder same as those used in the cathode layer may be used. The contents of the foregoing in the anode layer, and the thickness of the anode layer may be the same as conventional ones.

There is no particular limitations on the methods of manufacturing the cathode layer, the electrolyte layer, and the anode layer. These layers may be manufactured according to known methods. For example, when the cathode layer is made, the cathode layer may be manufactured by: mixing a material to constitute the cathode layer with a solvent to form a slurry; applying the slurry to a substrate or the cathode current collector; and drying the resultant. The same method may be employed as the methods of manufacturing the electrolyte layer and the anode layer. The stack 11 may be made by stacking the cathode current collector, the cathode layer, the electrolyte layer, the anode layer, and the anode current collector in this order.

The electrode terminals 12 are for electrically connecting the stack 11 and any external device. As in FIG. 1, the electrode stack 10 is provided with two electrode terminals 12 (a cathode terminal **12*a* and an anode terminal 12*b*). The cathode terminal 12*a* is connected to the cathode current collector. The anode terminal 12*b* is connected to the anode current collector. The electrode terminals 12 are disposed as respectively penetrating through holes 22*a* in one of the inner lids 22 to stick out. Any known metallic material may be used as the material of the electrode terminals 12**.

<Outer Casing 20>

The outer casing 20 has a hollow-shaped laminated-film outer casing 21 that covers both the end faces and a pair of the facing side faces of the electrode stack 10 in the stacking direction, and the inner lids 22 disposed at opening parts **21*a* of the laminated-film outer casing 21. The inner lids 22 each have a protruding part 22*b* extending from the peripheral portion thereof to the inside of the outer casing 20. At least part of the electrode stack 10 is present in the areas surrounded by the protruding parts 22*b*. The secondary battery 100 using such an outer casing 20** is capable of improving the structural efficiency thereof.

Here, "side face" of the electrode stack 10 is a face formed of outer edges of the stacked electrode element(s). In this description, a direction where the electrode stacks 10 are stacked is referred to as a stacking direction, a direction along the long sides of the electrode stack 10 is referred to as a long side direction, and a direction along the short sides of the electrode stack 10 is referred to as a short side direction. In this case, the direction in which the protruding parts **22*b* protrude is the long side direction. At this time, "the protruding parts 22*b* extending from the peripheral portions of the inner lids 22 to the inside of the outer casing 20" each consist of portions protruding in the long side direction from both the edges of the inner lid in the stacking direction and both the edges thereof in the short side direction (parts 22*c* and 22*d* described later). These portions are connected to each other at end portions thereof. That is, these portions can be referred to as one protruding part 22*b* protruding from the entire peripheral portion of the inner lid 22**.

Figure 3B:
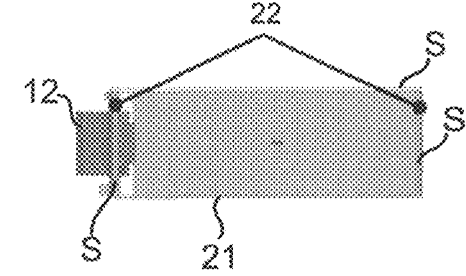
FIG. 3B is a top view of the secondary battery 100.
Figure 5:
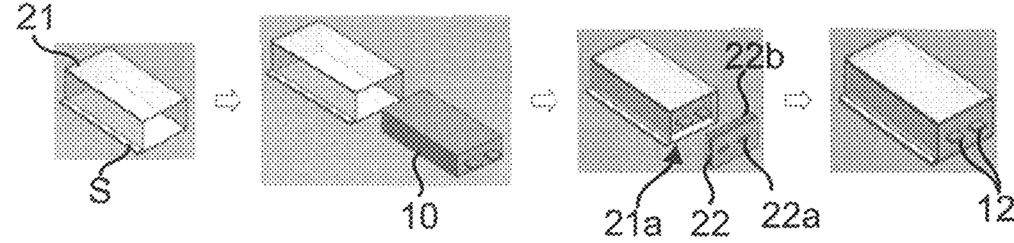
FIG. 5 shows one example of a method of manufacturing the secondary battery 100.

FIGS. 3A to 6 show the comparison between a conventional secondary battery and the secondary battery 100. FIG. 3A is a top view of a conventional secondary battery. FIG. 3B is a top view of the secondary battery 100. FIG. 4 shows one example of a method of manufacturing a conventional secondary battery. FIG. 5 shows one example of a method of manufacturing the secondary battery 100. FIG. 6 is a cross-sectional view of a conventional secondary battery (top) and the secondary battery 100 (bottom), focusing on electrode terminals sides.

As shown in FIG. 4, a conventional secondary battery is made as follows. First, a lower laminated film having a predetermined space in the center is prepared, and an electrode stack is stored in the space. Next, an upper laminated film having the same shape as the lower laminated film is put on the lower laminated film, and the peripheral portions where these laminated films overlap are joined. As shown in FIGS. 3A to 4, a sealing portion S is present along the peripheral portion (four sides) of a secondary battery made as described above. The sealing portion S is a portion necessary for welding the two laminated films to seal the electrode stack in the welded laminated films, and at the same time, needs a certain sealing width for satisfying requirements such as a predetermined strength and moisture transmittance. Therefore, such a sealing portion causes deterioration of the structural efficiency of the secondary battery. It is also necessary to emboss the laminated films in a predetermined manner in order to form such a sealing portion.

In contrast, as shown in FIG. 5, the secondary battery 100 is made as follows. First, the hollow-shaped laminated-film outer casing 21 is prepared, and the electrode stack 10 is stored therein. Next, the inner lids 22 are disposed at the opening parts 21*a* of the laminated-film outer casing 21, and the peripheral portions of the inner lids 22 and part of the laminated-film outer casing 21 which overlaps the peripheral portions of the inner lids 22 are joined. This joining may be according to a known method without any particular limitations. Examples of such a method include heat welding, bonding with an adhesive, joining by pressing unitedly, and joining using a laser.

Figure 7A:
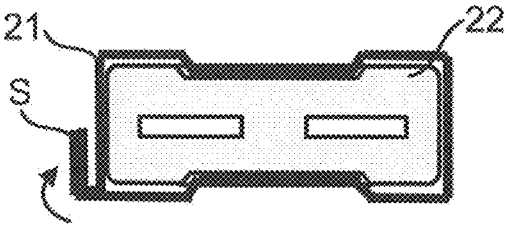
FIG. 7A is a schematic view of a laminated-film outer casing 21 where a sealing portion S is folded on a side face side.
Figure 7B:
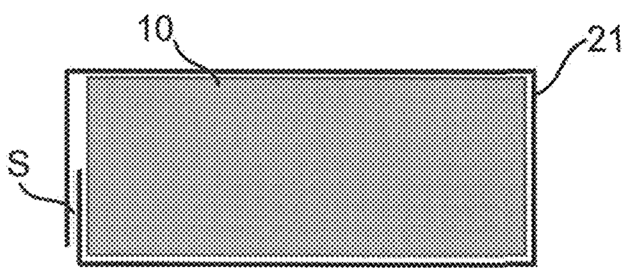
FIG. 7B is a schematic view of the laminated-film outer casing 21 where the sealing portion S is joined on a side face.

Here, the laminated-film outer casing 21 is formed by molding one laminated film to have a hollow shape: both the ends of the laminated film are joined to form the sealing portion S along one side of this hollow structure. Specifically, the laminated-film outer casing 21 is made by: bending a laminated film, so that the bended laminated film has a hollow shape, as areas to serve as joined portions (sealing portion S) are left along both the ends of the laminated-film; and joining both the overlapping ends. Therefore, the sealing portion S of the laminated-film outer casing 21 is the one side only. As described above, use of the hollow-shaped laminated-film outer casing 21 can reduce the sealing portion. As in FIG. 7A, the laminated-film outer casing 21 may be folded, so that the sealing portion S overlaps a side face thereof. This further improves the structural efficiency of the battery. Alternatively, as in FIG. 7B, both the ends may be superposed on and joined to each other on a side face of the laminated-film outer casing 21. In this case, it is necessary to provide adhesive layers on surfaces of the ends which are to be an inner side because it is necessary to join adhesive layers. The foregoing leads to the sealing portion S not sticking out of any side face, which further improves the structural efficiency of the battery.

The inner lids 22 each have the protruding part 22*b* extending from the peripheral portion thereof to the inside of the outer casing 20. At least part of the electrode stack can be present in the areas surrounded by the protruding parts 22*b*. For example, part of the stack 11 (electrode element) and the electrode terminals 12 may be present in these areas. These areas overlap the portions where the inner lids 22 and the laminated-film outer casing 21 are joined. Thus, at least part of the electrode stack is present in these areas whereby deterioration of the structural efficiency due to the sealing portion is suppressed and the structural efficiency of the entire secondary battery 100 is improved.

As in FIG. 5, the inner lids 22 have the through holes 22*a*, which the electrode terminals 12 penetrate. The electrode terminals 12 penetrate the through holes 22*a* to stick out. As described above, in the secondary battery 100, the electrode terminals 12 may be disposed apart from the sealing portion S in the stacking direction, which can suppress softening of the sealing portion S due to heat generated by the electrode terminals 12. A conventional secondary battery is in a form where electrode terminals are disposed inside the sealing portion S, which may lead to softening of the sealing portion due to heat generated by the electrode terminals and then peeling of the softened sealing portion. Therefore, a cooling mechanism or the like is provided with a conventional secondary battery for suppressing heat generation. On the contrary, the secondary battery 100 is capable of suppressing softening of the sealing portion S due to heat generated by the electrode terminals 12, which can reduce the size of a cooling mechanism, or makes it possible not to use a cooling mechanism, to downsize the structure of the battery. Therefore, the inner lids 22 can contribute not only to improvement of the structural efficiency, but also to downsizing of the battery.

There is no particular limitations on the length of the protruding part 22*b* of each of the inner lid 22 (length in the protruding direction) as long as the length is equal to the width of the sealing portion S. A predetermined adhesive layer (such as a tab film) may be provided on, or predetermined surface treatment or the like may be given to each of the surfaces of the peripheral portions and the protruding parts 22*b* of the inner lids 22, so that the inner lids 22 are suitably adherable to the laminated-film outer casing 21. This makes it unnecessary to emboss the portions where the inner lids 22 and the laminated-film outer casing 21 adhere to each other. The fact that embossing is not necessary reduces limitations on the size of the outer casing 20.

The effect of the inner lids 22 such that the structural efficiency is improved will be further described, using FIG. 6. FIG. 6 is a cross-sectional view of a conventional secondary battery (top) and the secondary battery 100 (bottom), focusing on electrode terminals sides. As shown in FIG. 6, in a conventional secondary battery, part of a laminated film inside which only electrode terminals are disposed is joined, as a portion thereof in which the current collectors and the electrode terminals are connected (connection portion C) is avoided because there is unevenness in the connection portion C in the conventional secondary battery, which makes it difficult to form the sealing portion thereon, and which makes it difficult to ensure sealability even if the sealing portion is formed thereon. In contrast, in the secondary battery 100, the sealing portion S is formed on the peripheral portions of the inner lids 22 which include the protruding part 22*b*, and the protruding parts 22*b*, and the current collectors and the electrode terminals 12 are connected in the area held by one of the protruding parts 22*b*. That is, the connection portion C and the sealing portion S overlap when viewed in the stacking direction. Therefore, it is possible to effectively utilize the inside of the sealing portion S, which improves the structural efficiency of the secondary battery 100 by a length indicated by X in FIG. 6, as compared with the conventional secondary battery.

As described above, the secondary battery 100 is capable of improving the structural efficiency more than a conventional secondary battery. On the contrary, the secondary battery 100 using the outer casing 20 may raise the following problems.

Usually, a plurality of secondary batteries are stacked to be used as shown in FIG. 2. At that time, a certain confining pressure is applied toward the inside in the stacking direction by means of confining plates R or the like. This improves the adhesiveness of the electrode stacks (electrode element), so that improvement of the battery performance is achieved. On the contrary, in the secondary battery 100, the laminated-film outer casing 21 and the peripheral portions of the inner lids 22 are joined. Thus, such a case may be considered that the inner lids 22 having some thickness make it impossible to apply the confining pressure by means of the confining plates R. Therefore, in the secondary battery 100, the thickness of each of the inner lids 22 is designed to be smaller than that of the electrode stack. This makes it possible to apply a certain confining pressure to the electrode stacks 10 by means of the confining plates R or the like. The thickness of the inner lid 22 is preferably as thick as possible. For example, preferably, the difference between the thickness of the inner lid 22 and that of the electrode stack 10 is within the range of 0.2 and 0.8 mm.

Figures 8A, 8B:
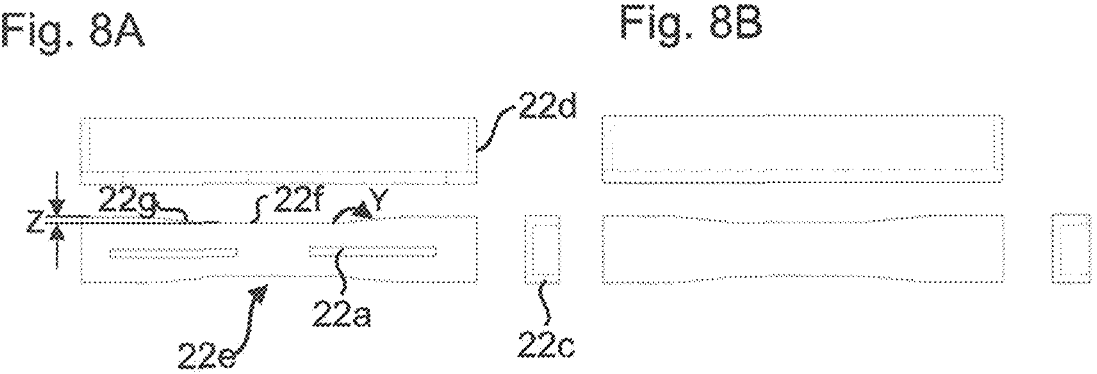
FIGS. 8A and 8B show top views (top), front views (bottom left-hand), and side views (bottom right-hand) of inner lids 22.

As described above, in the secondary battery 100, the inner lids 22 each having a smaller thickness than the electrode stack 10 are used. However, in this case, portions of the laminated-film outer casing 21 which have lengths by differences between the foregoing thicknesses may cause twisting and deflection in the joined portion (sealing portion S), to make it impossible to suitably heat-weld the inner lids 22 and the laminated film. Thus, in order to suppress such twisting and deflection, the protruding parts **22*b* may each have a gently concave shape (depressions 22*e*). FIGS. 8A and 8B show top views (top), front views (bottom left-hand), and side views (bottom right-hand) of the inner lids 22. FIG. 8A shows one of the inner lids 22 which is disposed on the side where the electrode terminals 12 are provided. FIG. 8B shows the other of the inner lids 22 which is disposed on the side where the electrode terminals 12 are not provided. In FIGS. 8A and 8**B, the dotted lines represent inner walls seen through.

As shown in FIGS. 8A and 8B, the protruding parts **22*b* each include the parts 22*c* extending from both the edges of the inner lid 22 in the stacking direction, and the parts 22*d* extending from both the edges thereof in the short side direction. The inner lids 22 including such parts 22*c* and 22*d* are components each having a U-shaped cross section both in the stacking direction and in the short side direction. In view of absorption of the difference in thickness, the parts 22*c*** each have a gently concave shape.

Here, the gently concave shape (depressions **22*e*) is not particularly limited as long as capable of absorbing an extra portion of the laminated-film outer casing 21 which is based on the difference in thickness between the inner lid 22 and the electrode stack 10. For example, the following conditions may be given for the gently concave shape: (1) the depressions 22*e* is each formed of a bottom side part 22*f*, and two oblique side parts 22*g* extending from both the ends of the bottom side part 22*f*; (2) an angle Y formed by the bottom side part 22*f* and any one of the oblique side parts 22*g* is at least 90° and less than 180°, and preferably at least 120° and less than 180°; and (3) a length Z between the bottom side part 22*f* and the ends of the oblique side parts 22*g* in the stacking direction is more than 0 and at most 1/5 of the thickness of the inner lid 22**, and preferably more than 0 and at most 1/10 thereof.

The parts **22*c* of the protruding parts 22*b* each have the gently concave shape as described above whereby an extra portion of the laminated-film outer casing 21 which is based on the difference in thickness between the inner lid 22 and the electrode stack 10** may be absorbed, to suppress twisting and deflection.

As the material of the laminated-film outer casing 21, a known laminated film may be used. An example of this material is an aluminum laminated film. The inner lids 22 are not particularly limited as long as the material thereof has airtightness and is hardly permeable to moisture. Examples of the inner lids 22 include monolithic products in combinations of a metal or a resin, and an aluminum sheet.

<Supplement>

Hereinafter the secondary battery according to the present disclosure will be supplementarily described. The example where a solid battery is used as the secondary battery 100 has been described. The secondary battery according to the present disclosure is not limited to this, but may be a liquid-based battery. When the secondary battery according to the present disclosure is a liquid-based battery, any known electrode element may be used.

The secondary battery 100 has such an embodiment that the cathode terminal **12*a* and the anode terminal 12*b* respectively pass through the through holes 22*a* of one of the inner lids 22**. The secondary battery according to the present disclosure is not limited to this, but may also have such an embodiment that one through hole is provided with each of the inner lids, one electrode terminal passes through the through hole in one of the inner lids, and the other electrode terminal passes through the through hole in the other thereof.

For the secondary battery 100, the example where the laminated-film outer casing 21 is made out of one laminated film has been described. The secondary battery according to the present disclosure is not limited to this, but may use a molded laminated film such as to have a hollow shape which is obtained by: superposing two laminated films; and heat-welding the ends of both the superposed laminated films. Even in this case, the secondary battery according to the present disclosure is capable of improving the structural efficiency because using predetermined inner lids.

As in FIG. 5, in the secondary battery 100, the hollow-shaped laminated-film outer casing 21 houses the electrode stack 10. The secondary battery according to the present disclosure is not limited to this. One may prepare the electrode stack (the electrode stack and the inner lids), wind a laminated film around the electrode stack, and join the ends of the wound laminated film, so as to store the electrode stack in the hollow-shaped laminated-film outer casing. As in FIG. 5, according to the method of storing the electrode stack in the hollow-shaped laminated-film outer casing, a predetermined gap between the laminated-film outer casing and the electrode stack is necessary when the electrode stack is stored. In contrast, no such a gap is generated according to the method of winding a laminated film around the electrode stack, and storing the electrode stack in the laminated-film outer casing, which is advantageous.

The secondary battery 100 uses the hollow-shaped laminated-film outer casing 21, which covers both the end faces and a pair of the facing side faces of the electrode stack 10 in the stacking direction. The secondary battery according to the present disclosure is not limited to this. A hollow-shaped laminated film that covers at least both the end faces and a pair of the facing side faces of the electrode stack in the stacking direction, that is, a laminated film of a bottomed hollow shape which covers five faces of the electrode stack including both the end faces in the stacking direction may be used. Since such a laminated film has one opening part, the number of the inner lid(s) may be one.

For the secondary battery 100, the example where the parts 22*c* along both the ends in the stacking direction each have the gently concave shape has been given. The secondary battery according to the present disclosure is not limited to this. It is sufficient that at least part of each of the protruding parts has the gently concave shape. That is, each of the protruding parts may have a gently concave shape including one depression, and may have a gently concave shape including depressions in both the ends in the stacking direction and in both the ends in the short side direction.

INDUSTRIAL APPLICABILITY

The secondary battery according to the present disclosure is to improve the structural efficiency, and in view of downsizing of the battery, can be said to relate to an important technique in the field of batteries.

REFERENCE SIGNS LIST

10 electrode stack
11 stack
12 electrode terminal
12*a* cathode terminal
12*b* anode terminal
20 outer casing
21 laminated-film outer casing
21*a* opening part
22 inner lid
22*a* through hole
22*b* protruding part
22*c* part
22*d* part
22*e* depression (concave shape)
22*f* bottom side part
22*g* oblique side part
R confining plate
S sealing portion
C connection portion

What is claimed is:

1. A secondary battery comprising:

an electrode stack formed by stacking a sheet-shaped electrode element; and an outer casing housing the electrode stack thereinside, wherein the outer casing includes a hollow-shaped laminated-film outer casing that covers at least both end faces and a pair of facing side faces of the electrode stack in a stacking direction, and an inner lid disposed at an opening part of the laminated-film outer casing, the inner lid has a protruding part extending from a peripheral portion thereof to an inside of the outer casing, and at least a portion of the electrode stack is present in an area surrounded by the protruding part, in the stacking direction, a maximum thickness of the inner lid is smaller than a maximum thickness of the electrode stack, and the peripheral portion of the inner lid and an end portion of the laminated-film outer casing are joined to each other to seal the electrode stack in the outer casing, the end portion of the laminated-film outer casing overlapping the peripheral portion of the inner lid;

wherein the inner lid is partially exposed.

2. The secondary battery according to claim 1, wherein the electrode stack has a stack formed by: stacking a current collector, a cathode layer, an electrolyte layer, and an anode layer; and an electrode terminal connected to the current collector, the inner lid has a through hole penetrated by the electrode terminal, the electrode terminal penetrating the through hole to stick out, and in the area surrounded by the protruding part, the current collector and the electrode terminal are connected to each other.

3. The secondary battery according to claim 1, wherein at least a portion of the protruding part has a concave shape when viewed from a front of the inner lid.

4. The secondary battery according to claim 1, wherein the laminated-film outer casing is formed by molding one laminated film to have a hollow shape.

* * * * *